United States Patent
Whiteside

(10) Patent No.: US 9,551,142 B2
(45) Date of Patent: Jan. 24, 2017

(54) GREASE INTERCEPTOR SYSTEM AND METHOD OF INSTALLING A GREASE INTERCEPTOR SYSTEM

(71) Applicant: MIFAB, Inc., Chicago, IL (US)

(72) Inventor: Michael James Whiteside, Chicago, IL (US)

(73) Assignee: MIFAB, Inc., Chicago, IL (US)

( * ) Notice: Subject to any disclaimer, the term of this patent is extended or adjusted under 35 U.S.C. 154(b) by 143 days.

(21) Appl. No.: 14/313,271

(22) Filed: Jun. 24, 2014

(65) Prior Publication Data

US 2015/0122728 A1 May 7, 2015

Related U.S. Application Data

(60) Provisional application No. 61/900,130, filed on Nov. 5, 2013.

(51) Int. Cl.
| | | |
|---|---|---|
| *E03F 5/16* | (2006.01) | |
| *C02F 1/40* | (2006.01) | |
| *B65D 90/10* | (2006.01) | |

(52) U.S. Cl.
CPC .............. *E03F 5/16* (2013.01); *B65D 90/105* (2013.01); *C02F 1/40* (2013.01); *Y10T 29/49428* (2015.01)

(58) Field of Classification Search
CPC .............. E02F 5/16; E02F 11/00; C02F 1/40; B65D 88/76; B65D 90/105

USPC ........ 210/170.01, 170.08, 532.1, 532.2, 538, 210/540; 220/4.12, 4.13, 565, 601, 661
See application file for complete search history.

(56) References Cited

U.S. PATENT DOCUMENTS

| | | | | |
|---|---|---|---|---|
| 5,361,930 A | * | 11/1994 | Perry ...................... | E03F 11/00 220/4.12 |
| 5,569,376 A | * | 10/1996 | Graves ............... | B01D 21/0003 210/532.2 |
| 5,950,860 A | * | 9/1999 | Kesterman ........... | B65D 90/105 220/4.26 |
| 6,077,448 A | * | 6/2000 | Tran-Quoc-Nam ...... | E03F 5/14 210/538 |
| 7,774,988 B2 | * | 8/2010 | Guitoneau ................ | E03F 5/02 220/4.13 |
| 2005/0178721 A1 | * | 8/2005 | Lombardi, II .......... | E03F 11/00 210/532.2 |
| 2006/0016132 A1 | * | 1/2006 | Shinehouse ............. | E03F 11/00 52/79.1 |
| 2006/0124640 A1 | * | 6/2006 | Richter ................... | E03F 11/00 220/4.21 |

FOREIGN PATENT DOCUMENTS

| | | | |
|---|---|---|---|
| EP | 2 085 326 | * | 8/2009 |
| GB | 2 374 352 | * | 10/2002 |

* cited by examiner

*Primary Examiner* — Christopher Upton
(74) *Attorney, Agent, or Firm* — Phillips Lytle LLP; David L. Principe

(57) ABSTRACT

A grease interceptor system with a corrugated pipe stub that can be obtained and cut to size in the field during installation.

5 Claims, 2 Drawing Sheets

GREASE INTERCEPTOR SYSTEM AND METHOD OF INSTALLING A GREASE INTERCEPTOR SYSTEM

CROSS-REFERENCE TO RELATED APPLICATION

The present invention claims priority benefit of U.S. Provisional Patent Application No. 61/900,130 entitled "Grease Interceptor" filed on Nov. 5, 2013, which is incorporated herein by reference.

TECHNICAL FIELD

The present invention relates generally to the field of plumbing, and more particularly to a system for installing a grease interceptor in a drain line.

BACKGROUND ART

Commercial food service establishments, such as restaurants, produce considerable amounts of organic material in their waste or drainage water which often includes high levels of grease or oil. Such materials can clog or adversely affect public wastewater and sewer systems. Most jurisdictions therefore require that such grease and oil be removed from the wastewater at the commercial establishment before it is permitted to enter the wastewater system.

To effect such removal, the commercial establishment will typically install a grease interceptor on its wastewater outlet line from its food preparation area, such as its kitchen. The purpose of the grease interceptor is to permit the free flow of wastewater, while capturing any grease or oils contained in the water. The process of grease interception involves the separating and retaining of globules of grease, fats and oils from wastewater as it passes through the grease interceptor. Typically the oily wastewater passes into the grease interceptor at one end and as the water flows through the interceptor it is slowed down, allowing the lighter than water components, such as grease and oil, to rise within the water accumulating in an upper layer in the interceptor. A fluid outlet from the grease interceptor is positioned below the level of the grease layer to permit substantially grease free wastewater to pass through the interceptor. In this way, the grease is collected in the grease interceptor and it may be periodically removed from the top of the grease interceptor. The grease is then disposed of as solid waste in accordance with local regulations, for example, by removal to landfill sites.

Grease interceptors are typically installed below grade and in line with wastewater outlet or effluent pipes. The distance between the finished grade and the top of the grease interceptor will typically vary depending on the distance of the grease interceptor from the building, the slope of the land, and other factors. Accordingly, the distance between the top of the grease interceptor and the finished grade may vary widely between installations. As a result, there is a need for an adjustable height lid.

BRIEF SUMMARY OF THE INVENTION

With parenthetical reference to the corresponding parts, portions or surfaces of the disclosed embodiment, merely for the purposes of illustration and not by way of limitation, the present invention meets the above described need by providing a grease interceptor system with a grease interceptor (10) having an inlet (23), an outlet (25), a bottom wall (53), at least one sidewall (56, 57), a top wall (59), and at least one opening (16) in the top wall (59). The top wall (59) has a recessed portion (62) surrounding the at least one opening (16) in the top wall (59). The recessed portion (62) has a recessed portion bottom wall (64) disposed adjacent to the at least one opening (16). A pipe stub (65) has a first end (68) and a second end (71) disposed opposite from the first end (68). The first end (68) is supported on the recessed portion bottom wall (64). A lid (27) is supported on the second end (71) of the pipe stub (65). The lid may be provided with a removable cover (28).

The system may further comprise a pipe stub (65) that is corrugated.

The system may further comprise a lid (27) attached to the pipe stub (65) by fastening means (75).

In another aspect, the top wall (59) has at least one recessed portion sidewall (63) surrounding and disposed in spaced apart relation to the pipe stub (65). A gasket (90) may be disposed between the recessed portion sidewall (63) and the pipe stub (65).

In another aspect, the invention comprises a method of installing a grease interceptor (10) below a surface (30) having a finished grade (31). The method includes providing a grease interceptor system with a grease interceptor (10) having an inlet (23), an outlet (25), a bottom wall (53), at least one sidewall (56, 57), a top wall (59), and at least one opening (16) in the top wall (59). The top wall (59) has a recessed portion (62) surrounding the at least one opening (16) in the top wall (59). The recessed portion (62) has a recessed portion bottom wall (64) disposed adjacent to the at least one opening (16). A pipe stub (65) has a first end (68) and a second end (71) disposed opposite from the first end (68). The first end (68) is supported on the recessed portion bottom wall (64).

The method also includes providing a lid (27) sized to cover the at least one opening (16) in the top wall (59).

The method also includes cutting a tube stub (65) to length in the field. The tube stub (65) is supported at a first end (68) by the recessed portion bottom watt (64). The tube stub (65) has a second end (71) configured to support the lid (27) such that a top surface of the lid (27) is substantially even with the finished grade (31).

DESCRIPTION OF THE PREFERRED EMBODIMENTS

Figure 1:
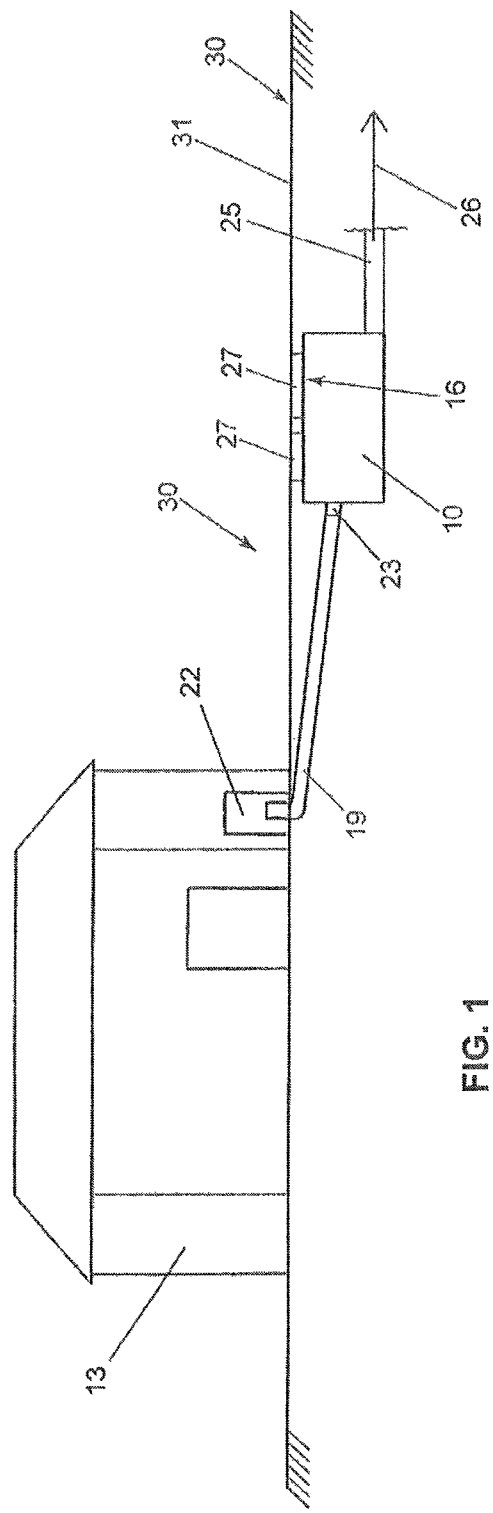
FIG. 1 is a schematic drawing showing a typical installation for a grease interceptor; and, FIG. 2 is a cross-sectional vie a grease interceptor of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIG. 1 thereof, a typical installation provides for locating the grease interceptor 10 away from a building 13 such as a restaurant in an area that is accessibly by a truck. The grease interceptor 10 has a top opening 16 that provides access to equipment on the truck for removing the waste.

A drain pipe 19 located at the outlet of a drain or basin 22 exits the building 13 and extends a distance away from the building 13 where the grease interceptor 10 is located. The drain pipe 19 connects to an inlet 23 of the grease interceptor 10. At the opposite side of the grease interceptor 10 an outlet 25 is located. The waste water minus the grease and oil flows from the outlet 25 and continues into the public wastewater system in the direction of arrow 26. The top of the grease interceptor 10 has at least one removable lid 27 that provides access for the removal of the waste. The removable lid 27 is typically located in a portion of a paved area 30 surrounding the building 13 and is made level with the finished grade 31 of the paved area 30. The lid 27 is made level with the finished grade 31 so that it does not become damaged or pose an obstacle.

The distance between the finished grade 31 and the top of the grease interceptor 10 will typically vary depending on the distance of the grease interceptor 10 from the building 13, the slope of the land, and other factors. Accordingly, the distance between the top of the grease interceptor 10 and the finished grade 31 may vary widely between installations. As discussed in detail below, the present invention is designed to utilize readily available materials that may be cut to length in the field to fit the required envelope.

Figure 2:
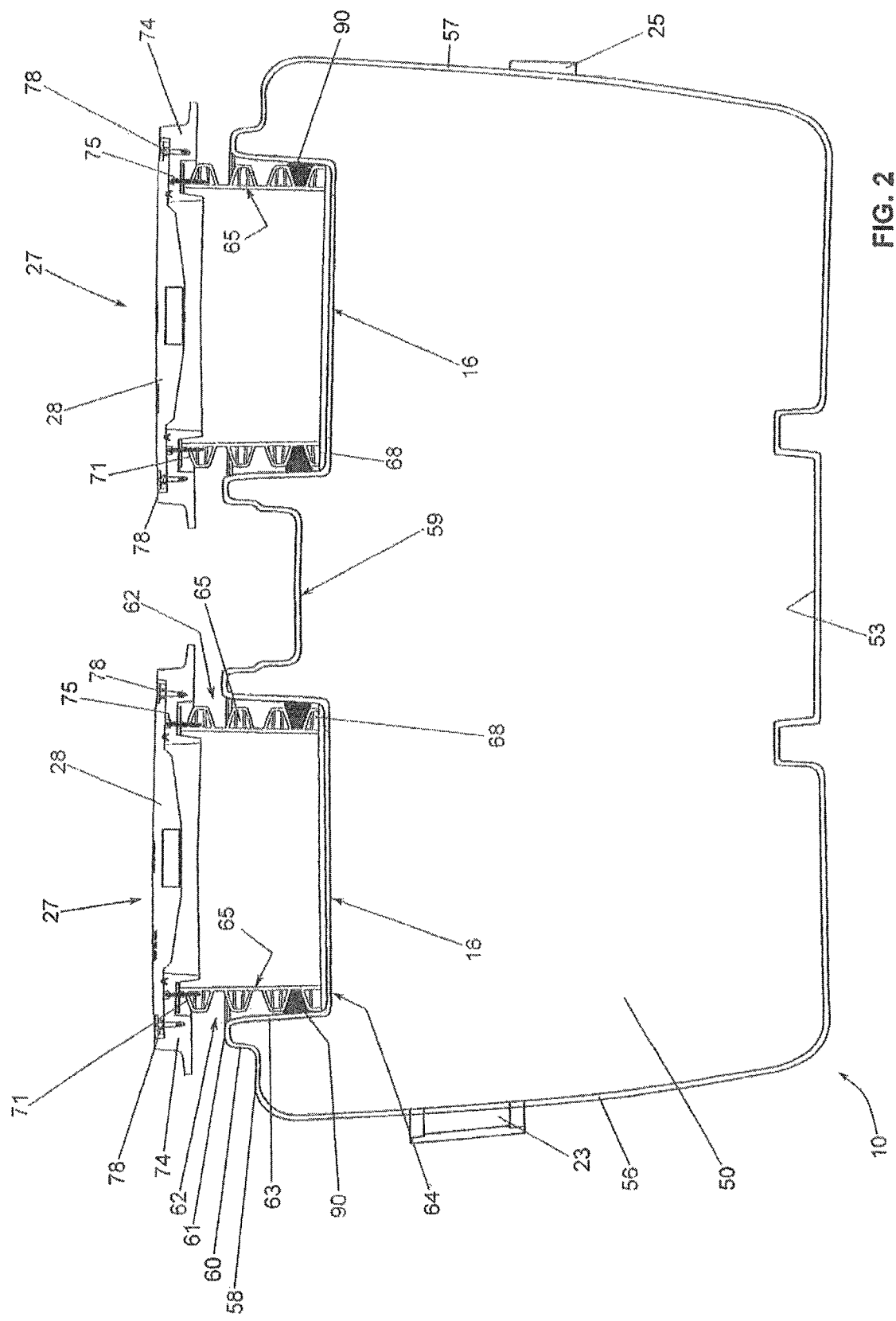

Turning to FIG. 2, a grease interceptor 10 has a body 50 formed by a bottom wall 53, side walls 56, 57 and a top wall 59. The top wall 59 has at least one opening 16 formed therein. The top wall 59 extends inward from sidewall 56 along a lateral portion 58. From lateral portion 58, the top wall 59 extends upward along a substantially vertical portion 60. Portion 60 extends to the uppermost surface 61 that is disposed adjacent to and extends to a recessed portion 62. The opening 16 is surrounded on the outside by the recessed portion 62 having a recessed portion side wall 63 and a recessed portion bottom wall 64 that forms a "shelf" around the opening 16. The recessed portion bottom wall 64 provides support for a corrugated pipe stub 65. A first end 68 of the pipe stub 65 engages with the recessed portion bottom wall 64 around the opening 16 when it is installed. The opposite second end 71 of the pipe stub 65 supports the lid 27. The lid 27 which may be plastic or cast iron has a collar 74 that may be attached to the corrugated pipe 65 by means of a screw 75 or other fastener, including but not limited to, mechanical fasteners such as nails, bolts, or the like or adhesives. The lid 27 has a cover 28 that is removably attached to the collar 74 by means of fastener 78 or the like to provide secure access to the opening 16 for clean out and removal of the waste for disposal by qualified personnel.

The system described above may be designed to receive a standard size corrugated pipe 65 such as a corrugated plastic pipe having an eighteen inch diameter. The corrugated pipe 65 may be obtained at any plumbing, hardware or contractor supply store such as Home Depot, Lowe's, or the like. The corrugated pipe 63 may be cut to the proper length in the field to fit the specific envelope for the system. The top of the lid 27 is typically located in a portion of a paved area 30 surrounding the building 13 and is made level with the finished grade 31 of the paved area 30. The lid 27 is made level with the finished grade 31 so that it does not become damaged or pose an obstacle. Accordingly, the corrugated pipe 65 may be measured and cut in the field after the grease interceptor 10 is installed. The corrugated pipe 65 is sized such that the top surface of the lid 27 is flush with the finished grade 31 surrounding it. A gasket 90 may be provided to seal the space between the corrugated pipe 65 and the side wall 63 of the recessed portion 62.

As will be evident based on this disclosure, many changes and modifications may be made. Therefore, while the presently-preferred form of the grease interceptor system has been shown and described, and several modifications and alternatives discussed, persons skilled in this art will readily appreciate that various additional changes and modifications may be made without departing from the spirit of the invention.

The invention claimed is:

1. A grease interceptor system, comprising:
a grease interceptor having an inlet, an outlet, a bottom wall, at least one sidewall, a top wall, and at least one opening in the top wall, the top wall having a recessed portion surrounding the at least one opening in the top wall, the recessed portion extending inward below the top wall of the grease interceptor and having a recessed portion bottom wall disposed adjacent to the at least one opening, the recessed portion bottom wall extending to a recessed portion sidewall, the recessed portion sidewall extending substantially parallel to the at least one sidewall of the grease interceptor;
a pipe stub having a first end and a second end disposed opposite from the first end, the first end supported on the recessed portion bottom wall, a substantial portion of the pipe stub being coextensive with the recessed portion sidewall;
a gasket disposed between an outer wall of the tube stub and the recessed portion sidewall and,
a lid having a collar surrounding a central opening, the central opening configured and arranged to align with opening in the grease interceptor when the lid is supported on the second end of the pipe stub.

2. The grease interceptor system of claim 1, wherein the pipe stub is corrugated.

3. The grease interceptor system of claim 1, further comprising a cover removably attached to the lid to cover the central opening.

4. The grease interceptor system of claim 1, wherein the lid is attached to the pipe stub by fastening means.

5. The grease interceptor system of claim 1, wherein the recessed portion sidewall is disposed in spaced apart relation to the pipe stub.

* * * * *